(12) United States Patent
Axmon et al.

(10) Patent No.: US 10,848,234 B2
(45) Date of Patent: Nov. 24, 2020

(54) BASE TRANSCEIVER STATION INTERFERENCE CANCELLATION FOR REUSE OF TERRESTRIAL CARRIER IN AIR-TO-GROUND COMMUNICATION

(71) Applicant: Telefonaktiebolaget LM Ericsson (publ), Stockholm (SE)

(72) Inventors: Joakim Axmon, Limhamn (SE); Esther Sienkiewicz, Ottawa (CA)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/500,385

(22) PCT Filed: Apr. 27, 2018

(86) PCT No.: PCT/EP2018/060976
§ 371 (c)(1),
(2) Date: Oct. 2, 2019

(87) PCT Pub. No.: WO2018/197709
PCT Pub. Date: Nov. 1, 2018

(65) Prior Publication Data
US 2020/0091995 A1    Mar. 19, 2020

Related U.S. Application Data

(60) Provisional application No. 62/491,533, filed on Apr. 28, 2017.

(51) Int. Cl.
*H04B 7/185* (2006.01)
*H04B 1/7107* (2011.01)
(Continued)

(52) U.S. Cl.
CPC ..... *H04B 7/18506* (2013.01); *H04B 1/71075* (2013.01); *H04L 25/0204* (2013.01);
(Continued)

(58) Field of Classification Search
CPC ............ H04B 7/18506; H04B 7/18504; H04B 7/0417; H04B 7/2041; H04B 1/71075;
(Continued)

(56) References Cited

U.S. PATENT DOCUMENTS 5,379,046 A * 1/1995 Tsujimoto ............ H01Q 3/2611
342/378
5,848,359 A * 12/1998 Furtaw ............... H04B 7/18506
455/447

(Continued)

FOREIGN PATENT DOCUMENTS

| CN | 101536360 A | * | 9/2009 |
| CN | 101536565 A | * | 9/2009 |
| CN | 101536566 A | * | 9/2009 |

OTHER PUBLICATIONS

PCT International Search Report, dated Aug. 1, 2018, in connection with International Application No. PCT/EP2018/060979, all pages.

(Continued)

*Primary Examiner* — Matthew C Sams
(74) *Attorney, Agent, or Firm* — Leffler Intellectual Property Law, PLLC; Kenneth B. Leffler (57) ABSTRACT

A terrestrial network node of a terrestrial mobile communication network is operated to simultaneously serve terrestrial and aerial coverage on a same carrier frequency. Such operation includes directing a first reception beam towards an aerial radio node. A second reception beam is directed towards a user equipment in the terrestrial mobile communication network. The signal received in the first reception beam is filtered to create a replica of a signal transmitted by the aerial radio node as received by the second reception beam. The replica is subtracted from the signal received by the second reception beam.

9 Claims, 7 Drawing Sheets

(51) Int. Cl.
*H04L 25/02* (2006.01)
*H04L 25/03* (2006.01)
*H04W 84/00* (2009.01)
*H04W 84/06* (2009.01)

(52) U.S. Cl.
CPC .... *H04L 25/03019* (2013.01); *H04L 25/0328* (2013.01); *H04L 25/03891* (2013.01); *H04W 84/005* (2013.01); *H04W 84/06* (2013.01)

(58) Field of Classification Search
CPC ..... H04W 16/28; H04W 84/06; H04W 24/02; H04W 36/32; H04W 16/02; H04W 84/005; H01Q 3/24; H01Q 3/26; H01Q 3/2605; H04L 25/0204; H04L 25/03019; H04L 25/0328; H04L 25/03891
See application file for complete search history.

(56) References Cited

U.S. PATENT DOCUMENTS

| | | | | |
|---|---|---|---|---|
| 6,157,685 A * | 12/2000 | Tanaka | | H04B 1/71075 |
| | | | | 375/346 |
| 6,236,362 B1 * | 5/2001 | Walley | | G01R 29/10 |
| | | | | 324/500 |
| 6,735,438 B1 * | 5/2004 | Sabatino | | H01Q 1/246 |
| | | | | 343/705 |
| 7,414,578 B1 * | 8/2008 | Courtade | | G01S 3/023 |
| | | | | 342/372 |
| 8,688,101 B1 * | 4/2014 | Hayes | | H04W 4/029 |
| | | | | 455/418 |
| 8,917,201 B2 * | 12/2014 | Malaga | | H04B 7/18506 |
| | | | | 342/159 |
| 9,813,969 B2 * | 11/2017 | Axmon | | H04W 36/00 |
| 10,084,529 B1 * | 9/2018 | Riechers | | H04B 7/18508 |
| 10,348,394 B1 * | 7/2019 | Bakr | | H04B 7/18504 |
| 2004/0052305 A1 * | 3/2004 | Olson | | H04B 1/7117 |
| | | | | 375/148 |
| 2006/0084474 A1 * | 4/2006 | Iacono | | H04W 16/28 |
| | | | | 455/562.1 |
| 2008/0102812 A1 * | 5/2008 | Chari | | 455/424 |
| 2008/0102813 A1 * | 5/2008 | Chari | | H04B 7/18506 |
| | | | | 455/424 |
| 2008/0102814 A1 * | 5/2008 | Chari | | H04W 16/28 |
| | | | | 455/424 |
| 2011/0182230 A1 * | 7/2011 | Ohm | | H04B 7/185 |
| | | | | 370/315 |
| 2013/0082867 A1 * | 4/2013 | Malaga | | H04B 7/086 |
| | | | | 342/40 |
| 2014/0024365 A1 * | 1/2014 | Mitchell | | H04B 7/212 |
| | | | | 455/431 |
| 2016/0205560 A1 * | 7/2016 | Hyslop | | H04W 24/02 |
| | | | | 455/454 |
| 2017/0019800 A1 * | 1/2017 | Liu | | H04W 16/28 |
| 2017/0127332 A1 * | 5/2017 | Axmon | | H04B 7/18506 |
| 2018/0005535 A1 * | 1/2018 | Kalathil | | B64C 39/024 |
| 2018/0069606 A1 * | 3/2018 | Jung | | H04B 7/0408 |
| 2018/0097560 A1 * | 4/2018 | Jalali | | H04W 28/0236 |
| 2018/0241461 A1 * | 8/2018 | Jalali | | H04B 7/18502 |
| 2018/0287691 A1 * | 10/2018 | Jalali | | H04W 16/28 |
| 2019/0173568 A1 * | 6/2019 | Jalali | | H04B 7/18504 |
| 2019/0260462 A1 * | 8/2019 | Axmon | | H04B 7/18506 |
| 2019/0349045 A1 * | 11/2019 | Varatharaajan | | H01Q 3/2605 |

OTHER PUBLICATIONS

PCT Written Opinion, dated Aug. 1, 2018, in connection with International Application No. PCT/EP2018/060979, all pages.
Dinc, Ergin et al., "Multi-User Beamforming and Ground Station Deployment for 5G Direct Air-to-Ground Communication", Research Gate, Dec. 2017, 8 pages.

* cited by examiner

FIG. 7

# BASE TRANSCEIVER STATION INTERFERENCE CANCELLATION FOR REUSE OF TERRESTRIAL CARRIER IN AIR-TO-GROUND COMMUNICATION

CROSS-REFERENCE TO RELATED APPLICATIONS

This application is a 35 U.S.C. § 371 national stage of international application PCT/EP2018/060976 filed Apr. 27, 2018, which claims the benefit of U.S. Provisional Application No. 62/491,533, filed Apr. 28, 2017. Both of these earlier applications are hereby incorporated herein by reference in their entireties.

BACKGROUND

The present invention relates to connectivity between land-based cellular communications systems and mobile cellular communications equipment located in air-borne craft, and more particularly to the reuse of terrestrial carrier frequencies for air-to-ground communication.

The world is becoming more and more connected, and this has led consumers to have increasing expectations of being able to be online and experience at least moderate data rates regardless of time and location. As one response to these expectations, the next generation of mobile technology, the so-called IMT-2020 (5G), targets high-speed mobility as one objective. The exemplary scenarios studied are high-speed trains and vehicles on freeways, but following the recent trend, it is expected that terrestrial in-flight broadband service for airplanes will be in the scope—either as direct communication between the User Equipment (UE) and base station, or via an access point (AP) onboard the aircraft which aggregates the traffic of some number of UEs and maintains a link to the base station.

In 2013 the Federal Communications Commission (FCC) took steps towards enabling better connectivity by assigning a 500 MHz wide subband in the 14 GHz radiofrequency (RF) band for in-flight air-to-ground broadband connection. The FCC's expectation is that by year 2021 there will be a demand for 15000 flights offering high-speed broadband connectivity to its passengers. By comparison, the availability in year 2013 was 3000 airplanes world-wide, and this was with connections that were deemed too slow and by far too expensive by consumers. The industry has noted that today's airline passengers expect the same level of broadband service that is available on the ground.

A number of systems have been deployed that offer terrestrial network coverage in lower frequency bands typically used for regular cellular networks. In the US, Go-Go Air operates a terrestrial air-to-ground network with very low capacity in the 800 MHz band. Several trials offering terrestrial network coverage in other low frequency bands typically used for regular cellular networks have also been carried out. In Europe, the European Aviation Network (owned by Deutsche Telekom and Inmarsat) is targeting the 2 GHz Multispectral Scanner System (MSS) band with planned operation in 2017-2018, but still with relatively low capacity. Recent advances on the regulatory side of aviation will, if properly exploited, greatly enhance and simplify in-flight broadband services that are based on terrestrial networks.

In an aspect of the technology described herein, it is observed that a new standard, called "Automatic Dependent Surveillance-Broadcast Out" (ADS-B OUT) has been or is on the way to being adopted in several parts of the world for the purpose of replacing Secondary Surveillance Radar (SSR) used by air traffic control (ATC). The existing system, SSR, is based on having a radar station ping an aircraft transponder (transmitter-responder) by which the transponder responds by sending information about the aircraft's identity, altitude, and the like. This allows ATC to track the aircraft and guide them to avoid collisions.

The newer system, ADS-B OUT, differs from SSR in that information is broadcast from the aircraft periodically, without first being triggered by a radar pulse. Information contained in the broadcast comprises (but is not limited to):
Aircraft identity and call sign
GPS-based position (latitude, longitude)
Altitude
GPS-based time at which position and altitude were determined Ground stations and proximal aircraft receive the broadcasts and relay them to the ATC facility that is responsible for that airspace. The system is less expensive than SSR since no radar stations are needed, and is up to 200 times more accurate, yielding a tolerance of 5.1 m with respect to position. The broadcast signals reach up to 280 km. The system can also be used when aircraft are taxiing on the ground.

The use of ADS-B OUT has already been mandated in Canadian and Australian airspaces, is mandated for use in European airspace for large aircraft starting in 2015 and for all aircraft starting in 2017, and is mandated for use in U.S. airspace starting in 2020. It is already mandated for some or all of the airways in Hong-Kong, Singapore, Vietnam, Taiwan, and Indonesia, and trials have been carried out in some countries such as South Korea and China. It is currently unclear when it will be mandated in the entire Asia-Pacific region, but although not mandatory the use of ADS-B is generally allowed. All major aircraft vendors now ship aircraft prepared with wiring for installment of ADS-B equipment and connection to the onboard flight navigation system and a certified Global Positioning System (GPS) receiver.

Figure 1:
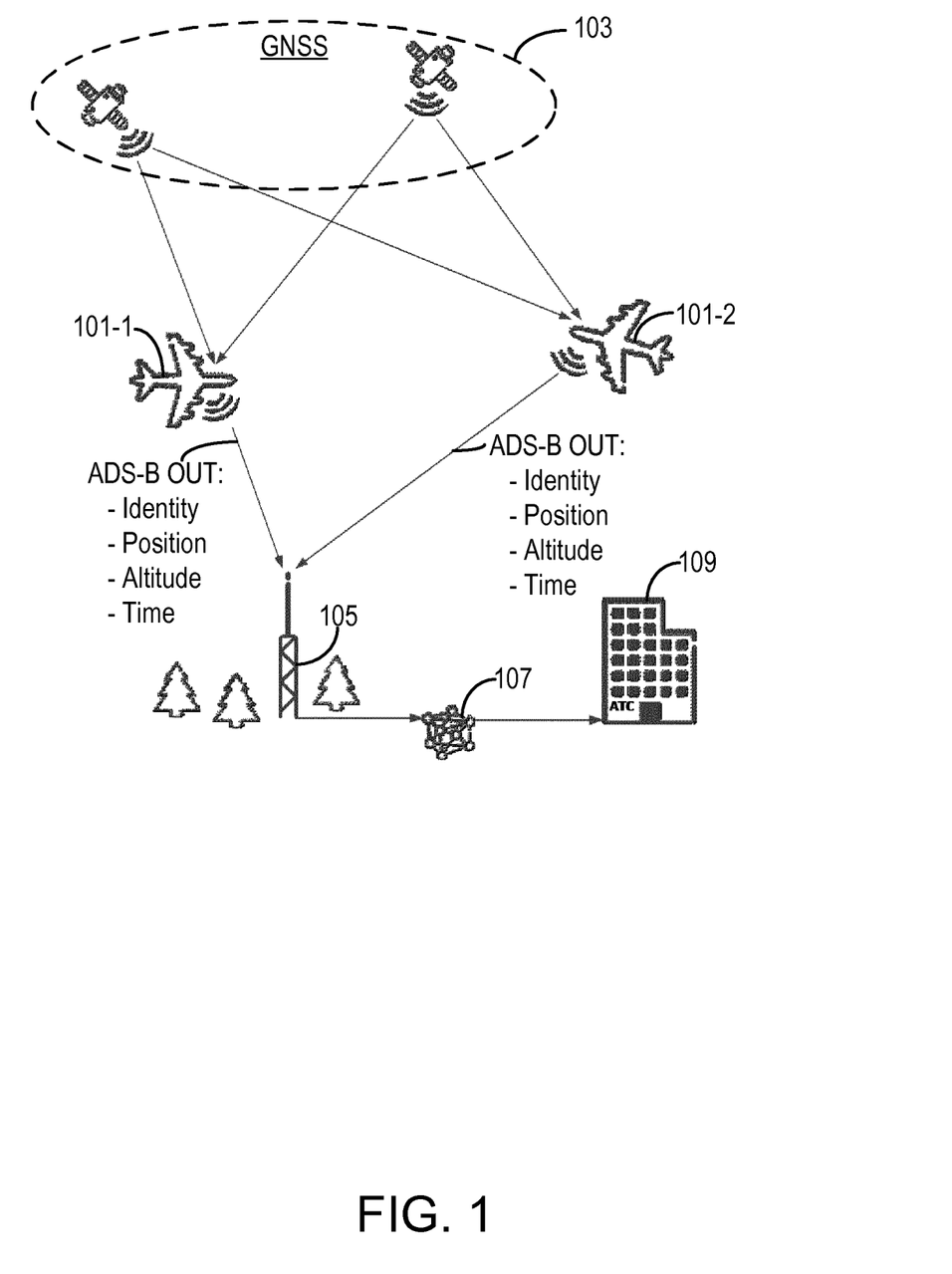
FIG. 1 illustrates an ADS-B deployment.

FIG. 1 illustrates an exemplary ADS-B deployment. Each airplane 101-1, 101-2 determines its position based on signals received from satellites that are part of a global navigation satellite system (GNSS), such as the United States' NAVSTAR GPS and the Russian GLONASS. Information indicating the airplane's identity, position, altitude and the time at which the coordinates were determined, is broadcast periodically and is received by a ground station 105 (and also by nearby airplanes). Once received by the ground station 105 the information is routed (e.g., through a communications network 107) to the ATC facility 109 responsible for that part of the airspace.

ADS-B OUT broadcasts can be received by aviation enthusiasts by using inexpensive equipment; a DVB-T USB dongle and open source software is all that is needed, at a cost of less than 20€. Professional grade ADS-B OUT receivers can be acquired for around 800€ including taxes. The rather inexpensive equipment has led to there being many ADS-B OUT receivers spread over the globe, and by sharing data with a server world-wide real-time tracking is possible. The most renowned service is Flightradar24, founded in Sweden and relying on 7000 volunteers internationally feeding received ADS-B OUT information to a centralized server. In short, receiving and decoding flight information is easily done and only requires inexpensive equipment. Identity, position and altitude can be determined for any airplane equipped with ADS-B OUT, which soon is to be a requirement in a large part of the global airspace.

The principles for maintaining coverage for mobile communication equipment on the ground are well known. So-called radio base stations are deployed at various geographical positions, and for a given mobile communication equipment, a "best-suited" base station is selected as the point of connection into the communications system. As the mobile communication equipment changes its position, the quality of its radio connection with the serving base station may deteriorate to the extent that a reselection is made, whereby a better-suited base station takes over as the serving base station.

It can be seen that in conventional telecommunications systems, which focus on communication with mobile devices on the ground, the deployment of base stations is designed to provide single macro cell coverage at each geographical position (except, of course, at cell edges where handovers of service occur from one base station to another). In order to achieve cost efficient communication with communication equipment aboard aircraft in the sky, it has been agreed that terrestrial carrier frequencies are allowed to be reused by air-to-ground (A2G) communication. Beamforming may be used to improve the A2G link both on uplink (mobile device to network node—denoted "UL") and downlink (network node to mobile device—denoted "DL") transmitter and receiver sides. But the uplink terrestrial coverage will still be particularly impacted when an airplane comes into the coverage area. This is because, even if a beam is directed towards the receiving base station, there will be reflections in the terrain around the base station, causing signals to be received not only from above the horizon (i.e., from the airborne device), but also from below (due to reflections).

The reflections from the A2G UL transmitter (TX) beam introduce interference, and therefore degrade the performance of the terrestrial coverage. The interference may be avoided by allocating A2G UL transmissions in physical resources that are orthogonal (i.e. different in time and/or frequency) to those used by terrestrial user equipments (UEs). But the use of orthogonal spectral resources comes at the expense of dramatically reducing the capacity in the terrestrial coverage.

In order not to reduce the capacity of the terrestrial coverage when the network node, such as a base transceiver station (BTS) is serving an A2G link, it is desired to have a better solution that allows the A2G link to reuse the physical resources used by terrestrial UEs.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology that operates a terrestrial network node of a terrestrial mobile communication network to simultaneously serve terrestrial and aerial coverage on a same carrier frequency. In one embodiment, a method of operating a mobile communication network node to simultaneously serve a user equipment in a terrestrial mobile communication network and an aerial radio node on a same carrier frequency is proposed. The method comprises:

directing a first reception beam towards the aerial radio node and receiving a first signal using the first reception beam;

directing a second reception beam towards the user equipment in the terrestrial mobile communication network and receiving a second signal using the second reception beam;

identifying a contribution associated with the first signal in the second signal;

filtering the first signal using an adaptive filter to provide a replica signal corresponding to the contribution associated with the first signal in the second signal; and subtracting the replica signal from the second signal to obtain a desired signal In accordance with another embodiment, a mobile communication network node for simultaneous communication with a user equipment in a terrestrial mobile communication network and an aerial radio node on a same carrier frequency is proposed. The network node comprises:

a first antenna array to receive a first signal from the aerial radio node;

a first beamformer to adjust antenna weights of the first antenna array to provide a first reception beam directed towards the aerial radio node;

a second antenna array to receive a second signal from the user equipment in the terrestrial mobile communication network;

a second beamformer to adjust antenna weights of the second antenna array to provide a second reception beam directed towards the user equipment in the terrestrial mobile communication network;

an adaptive filter adapted to receive the first signal and the second signal and to output a replica signal corresponding to a contribution associated with the first signal in the second signal; and a subtractor to subtract the replica signal from the second signal to obtain a desired signal.

In some but not necessarily all embodiments the filtering minimizes contributions of plural reception beams directed towards respective ones of plural aerial radio nodes.

In some but not necessarily all embodiments, a direction of the first reception beam is determined based on Global Positioning System (GPS) coordinates. In some but not necessarily all embodiments, the GPS coordinates are provided by ADS-B signals.

Embodiments may be in the form of:
methods;
apparatus configured to carry out functionality as defined above;
program product configured to carry out functionality as defined above; and/or
nontransitory computer readable storage medium comprising a set of instructions that, when performed by one or more processors, carry out functionality as defined above;

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function; field programmable gate arrays, etc.), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

Further, in some instances the description of embodiments may use the term "airplane". However, this is not intended to limit the invention in any way, and any such usage should be construed more broadly, for example as if the term "aircraft" (which encompasses not only airplanes, but other flying craft, such as helicopters or other rotorcraft) had been used.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of embodiments consistent with the invention, terrestrial service is improved by applying interference cancellation on the base station receiver side. The interference cancellation comprises identifying and subtracting (or otherwise removing) contributions of the A2G link signals that are present in received signals, leaving substantially only received signals associated with the terrestrial coverage.

In another aspect of embodiments consistent with the invention, the technology relies on the fact that the A2G link is known to be line-of-sight (LOS) and this provides a good reference signal for identifying multipath components of the A2G UL transmitter signal in the signal received in beams providing terrestrial coverage.

These and other aspects will now be defined in greater detail in the following description.

Figure 2:
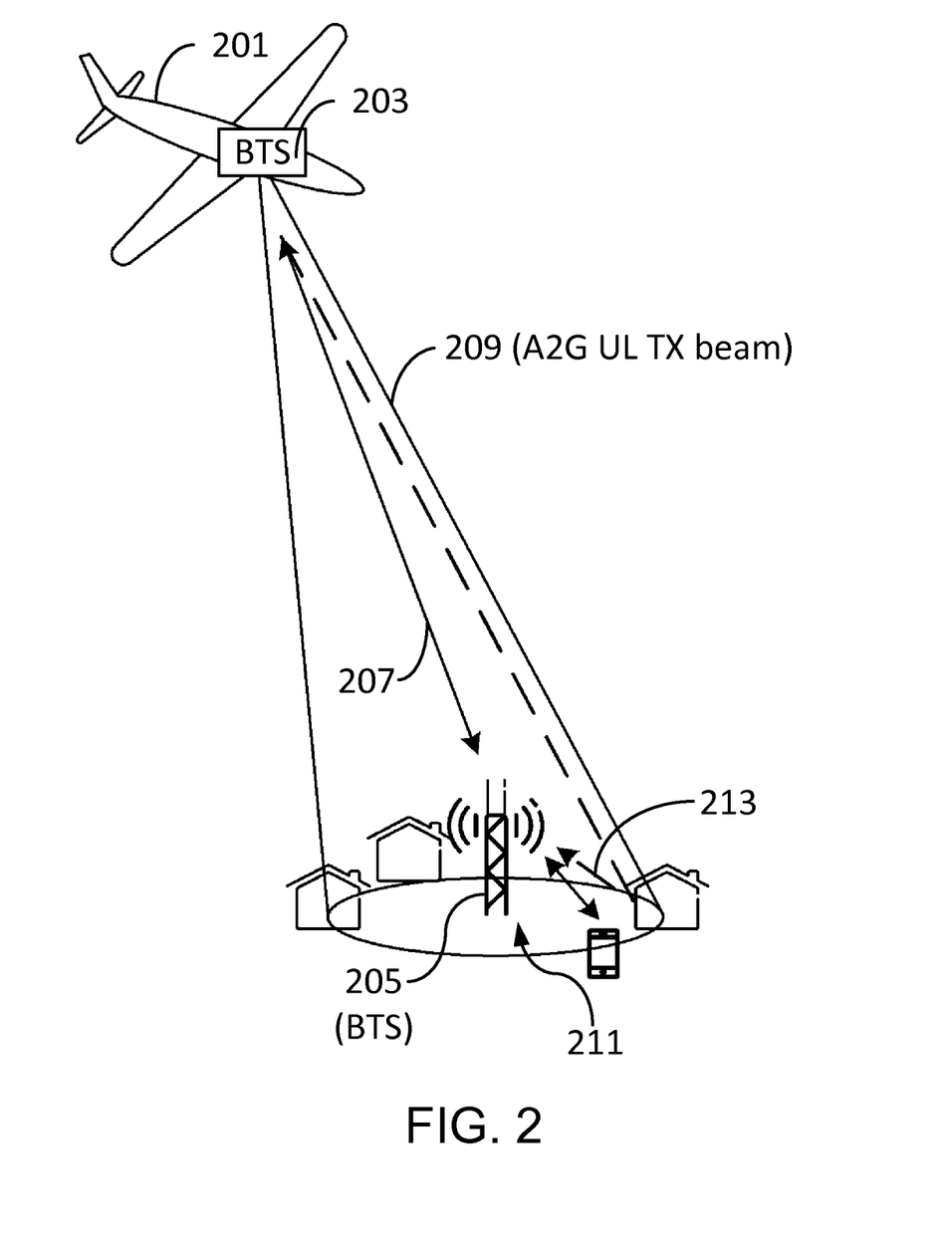
FIG. 2 illustrates an A2G UL TX beam being transmitted from airborne equipment towards a terrestrial BTS, and the resulting reflections that cause parts of the A2G UL TX signal to be received from directions associated with terrestrial coverage.

The inventors of the subject matter described herein have recognized the existence of problems associated with the reuse of terrestrial spectral resources for A2G communications and, this is illustrated in FIG. 2. The aircraft 201 is equipped with a base transceiver station (BTS) 203 that provides service to airborne users. The BTS 203 onboard the aircraft itself links to the network by communicating with a BTS 205 on the ground, with the A2G link 207 providing a backhaul for the airborne users.

The A2G backhaul link 207 reuses a carrier frequency that is also used by the terrestrial network. In order to avoid excessive interference, the airborne BTS 203 transmits using a beam 209 that is directed towards the BTS 205 on the ground.

Although the transmissions are directed towards the terrestrial BTS 205, the width of the beam causes the A2G UL TX beam 209 to be reflected in the surroundings 211 of the BTS 205 on the ground, and as a result, the A2G UL TX signal is received not only directly from the aircraft, but also from directions associated with terrestrial coverage (e.g., reflection 213). This results in a degraded performance and degraded capacity in the terrestrial network—either by the presence of increased interference (if a Multiple User, Multiple Input Multiple Output—"MU-MIMO"—approach is used) or by their being fewer physical resources available for the terrestrial and aerial coverages (when orthogonal/non-overlapping allocations are used).

It shall be noted that in arrangements such as the one illustrated in FIG. 2, the airborne BTS 203 is acting as a user equipment (UE) on the A2G link 207; that is, scheduling of transmissions from air-to-ground are managed by the BTS 205 on the ground.

Figure 3:
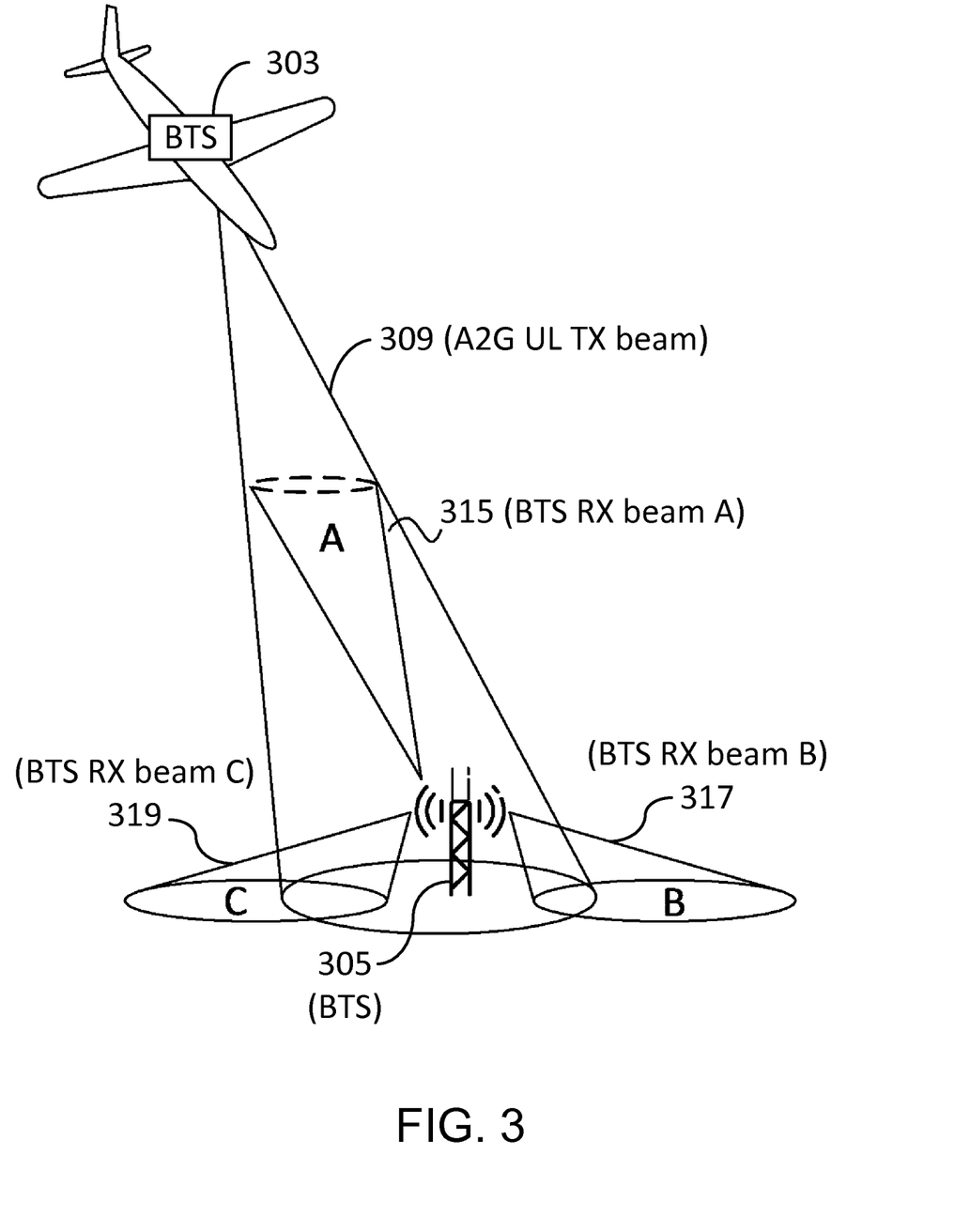
FIG. 3 includes a depiction of an A2G UL TX beam (associated with airborne service) and BTS UL RX beams (associated with terrestrial service), and illustrates aspects of embodiments consistent with the invention.

Aspects of how embodiments consistent with the invention address the above-described problem will now be described with reference to FIG. 3 which includes a depiction of an A2G UL TX beam 309 (associated with airborne service) and BTS UL RX beams (associated with terrestrial service).

The aircraft BTS 303 utilizes beamforming to direct the transmitted signal (A2G TX beam 309) towards the BTS 305 on the ground. At the same time the BTS 305 on the ground uses beamforming to receive the signal from the aircraft, shown in the figure as "BTS RX beam A" 315.

The BTS 305 on the ground also serves terrestrial equipment, and uses other beams, such as the illustrated BTS RX beams B and C (317, 319) directed below the horizon, for this purpose. The link between the aircraft's BTS 303 and the terrestrial BTS 305 is line-of-sight (LOS), but due to reflections in the terrain and buildings around the BTS 305 on the ground, reflections of the A2G UL TX beam 309 will be received also by the BTS RX beams B and C (317, 319). Signals transmitted by UEs on the ground are received only by BTS RX beams B and C (317, 319), not by BTS RX beam A 315, so they do not disturb the airborne service. (Reflections off the aircraft's fuselage of signals transmitted from the ground can be neglected due to the low probability of the signals being reflected towards the BTS 305 on the ground and the additional attenuation associated with the propagation path.)

Aspects of embodiments consistent with the invention apply interference cancellation to reduce the presence of A2G link interference in signals associated with the terrestrial communication service. This aspect of embodiments will now be described with reference to FIG. 4, which in one respect is a flow chart of steps/processes performed by circuitry in accordance with some but not necessarily all exemplary embodiments consistent with the invention. In another respect, FIG. 6 can be considered to depict exemplary means 400 comprising the various illustrated circuitry (e.g., hard-wired and/or suitably programmed processor) configured to perform the described functions.

Figure 4:
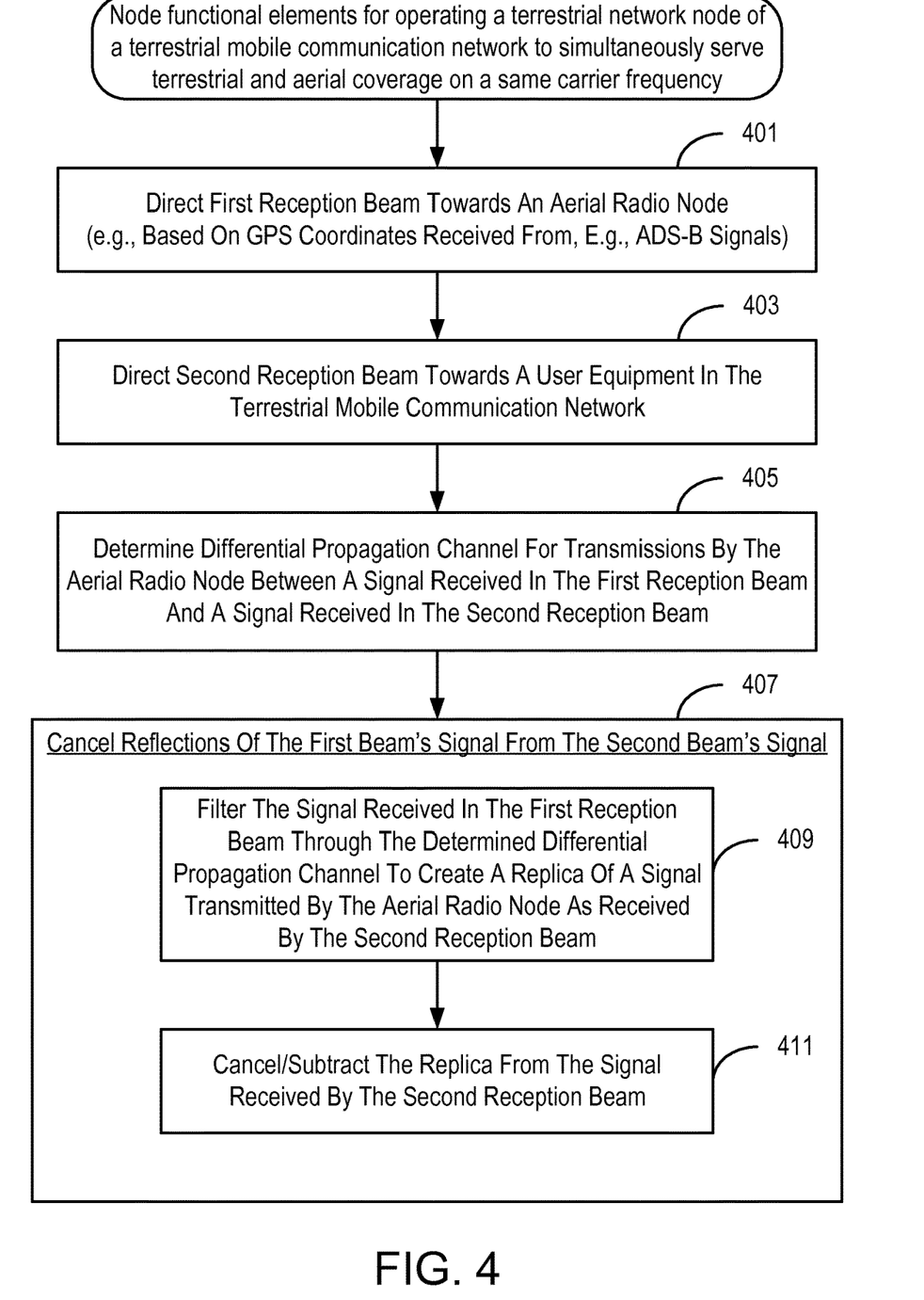
FIG. 4 depicts, in one respect, a flow chart of steps/processes performed by circuitry in accordance with some but not necessarily all exemplary embodiments consistent with the invention.

The functionality illustrated in FIG. 4 is performed by circuitry in a network node (e.g., the illustrated BTS on the ground) of a terrestrial cellular telecommunications system, and is for receiving signals from terrestrial transmitters in the presence of reflections of signals using the same carrier frequency from an A2G link.

The functionality includes identifying and/or directing at least one first reception beam that points above the horizon towards an aircraft (step 401). This beam is used for receiving the LOS signal from the aircraft, and also serves as a reference for estimating what the interfering signal(s) look like in signals from terrestrial transmitters.

The technology also identifies and/or directs at least one second beam that points below the horizon towards the ground (step 403). This beam is directed at user equipment in the terrestrial network.

A difference in propagation path is determined between the signal received by the at least one first beam, and the signal received by the at least one second beam (step 405). This is an estimate of the differential propagation channel for transmissions by the aerial radio node between the signal received in the first reception beam and the signal received in the second reception beam. Differential channel estimation can be performed by, for example, an adaptive filter. Such filters and this type of estimation are known in the art, and accordingly need not be described here in further detail.

The reflections of the signal associated with the at least one first beam are cancelled from the signal received by the at least one second beam (step 407). This is done by filtering the signal received in the first reception beam through the determined differential propagation channel to create a replica of the signal transmitted by the aerial radio node as received by the second reception beam (step 409). The replica is then subtracted (or otherwise canceled) from the signal received by the second reception beam (step 411).

In some, but not necessarily all embodiments, the direction of the first reception beam is based on GPS coordinates.

In some, but not necessarily all embodiments, the GPS coordinates are provided by ADS-B signaling.

Additional aspects of embodiments consistent with the invention will now be described with reference to FIG. 5, which is a block diagram of node equipment (e.g., in a ground-based BTS) capable of cancelling out reflections of A2G link signals from signals transmitted by terrestrial equipment.

Signals are received using one or more multi-element antenna arrays 100, 100a and routed via one or more radio distribution networks (RDN) 102, 102a to one or more transceivers (TRX) 104, 104a. Digital beamforming is carried out by respective beamformers 106, 108 in order to form beams A and B, where beam A is associated with the A2G link and beam B with terrestrial coverage.

The digital weights of the beamformer 106 for beam A are steered by an A2G UL RX beam tracker 116, which may get its target direction from ADS-B broadcasts which are received using antenna 118, and which further may tune the steering based on feedback, for example, from measurements on UL demodulation reference signals (DMRS) when such are transmitted, as indicated by a A2G TX Scheduler 114.

The digital weights of the beamformer for beam B may also be steered but based on legacy concepts in terrestrial coverage and hence this is not indicated in the block diagram.

The output signal from the beamformer 106 for beam A 106 is fed to an adaptive filter 110 which identifies the difference in propagation characteristics of the A2G UL TX signal between the received beam A and beam B. The output from the adaptive filter 110 is the estimated contribution of the A2G UL TX beam to the received beam B. The estimated contribution of the A2G UL TX beam to the received beam B is subtracted by a subtractor 112 in order to reduce the A2G UL TX signal's interference in the signal from beam B. The beam B signal processed in this manner is then used for further baseband processing.

In some but not necessarily all embodiments, the adaptive filter 110 is updated only when there are uplink transmissions on the A2G link, as indicated by the A2G TX Scheduler 114.

Figure 5:
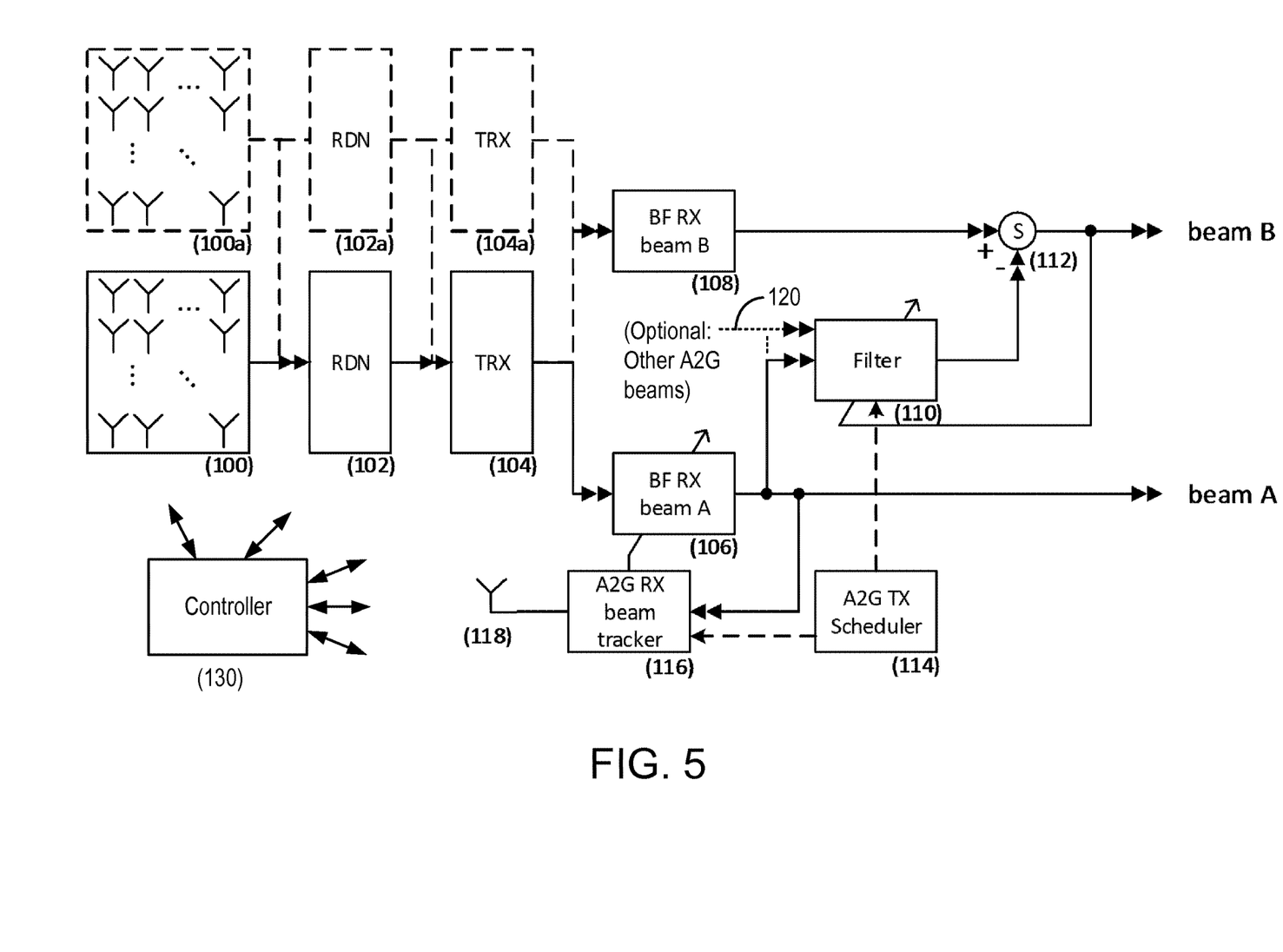
FIG. 5 is a block diagram of node equipment (e.g., in a ground-based BTS) capable of cancelling out reflections of A2G link signals from signals transmitted by terrestrial equipment.
Figure 6:
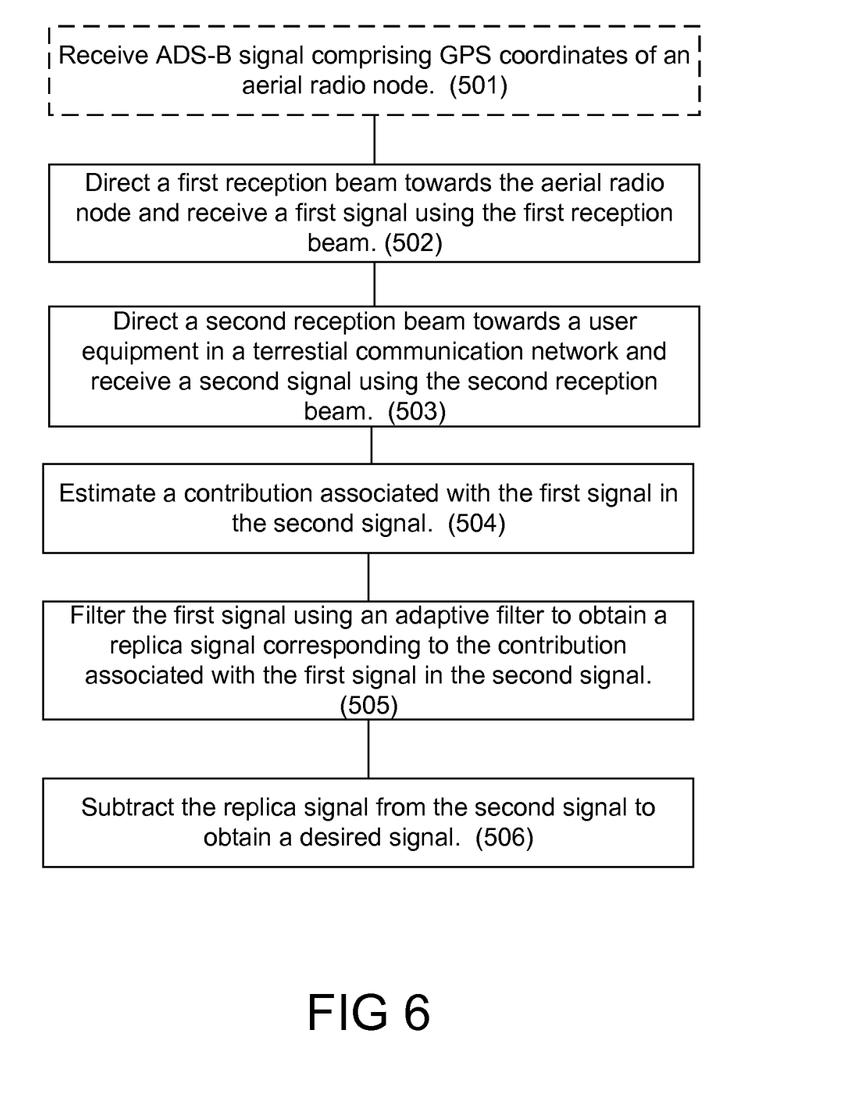
FIG. 6 depicts, a further flow chart of steps/processes performed e.g. by the node equipment of FIG. 5.

A method which may be used with e.g. the node equipment of FIG. 5 is shown in FIG. 6.

In step 501 GPS coordinates associated with an aerial radio node (such as BTS 203) associated e.g. with an aircraft in flight 201 are obtained. This could be by receiving an ADS-B signal sent from the aircraft or by another suitable means.

In step 502 a first reception beam 315 is directed towards the aerial radio node 203 and a first signal is received using the first reception beam.

A second reception beam 317, 319 is directed in step 503 towards a user equipment in a terrestrial communication network and a second signal, sharing the same carrier frequency as the first signal, is received using the second reception beam.

In step 504 a contribution associated with the first signal that may be present in the second signal is estimated. The contribution may be a consequence e.g. of a reflection of the first signal which could have been received by the second reception beam as part of the second signal.

In step 505 an adaptive filter 110 is used to filter the first signal to obtain a replica signal corresponding to the contribution associated with the first signal in the second signal.

Lastly, in step 506 the replica signal is subtracted from the second signal to obtain a desired signal associated with the terrestrial coverage.

The exemplary embodiments so far have focused on a situation involving only one A2G UL TX beam. But in some instances, there may be multiple A2G UL TX beams, each received with an associated BTS UL RX beam. These different beams may be transmitted by respective ones of multiple transmitters onboard different aircraft. Each of the multiple A2G UL TX beams may cause interference for a beam intended for terrestrial service, such as the BTS RX beam B 317 depicted in FIG. 3.

This situation is addressed in some, but not necessarily all embodiments by cancelling the interference of several A2G UL TX beams. For example, the exemplary embodiment of FIG. 5 can optionally further be configured to provide multiple associated BTS UL RX beam signals 130 as input to the adaptive filter 110, and configuring the adaptive filter 110 to minimize the contributions of these beams to BF RX beam B jointly.

The various operations may be controlled or, in some embodiments, even performed by a controller 130, whose connections to other components is schematically illustrated by the various arrows.

Figure 7:
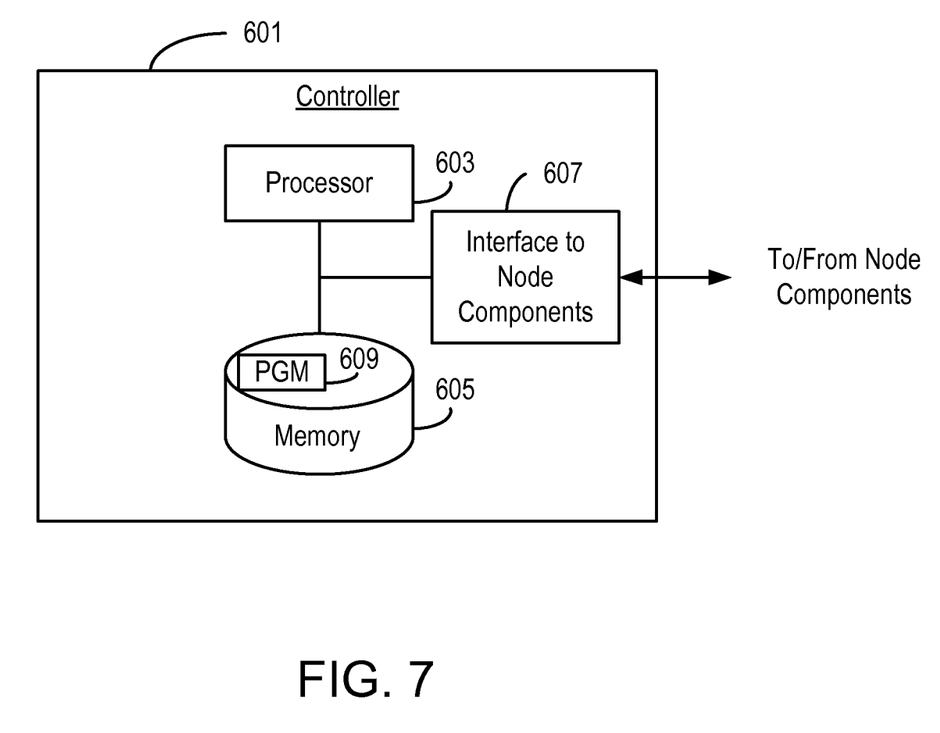
FIG. 7 is a block diagram of elements for carrying out various aspects of the invention.

Looking at further aspects of embodiments consistent with the invention, FIG. 7 is a block diagram of elements for carrying out various aspects of the invention as described above, such as in connection with FIGS. 2, 3, 4, and 5. In particular, a controller 601 (e.g., the controller 130 configured to be capable of carrying out the functionality described above) includes circuitry configured to carry out any one or any combination of the various functions described above. Such circuitry could, for example, be entirely hard-wired circuitry (e.g., one or more Application Specific Integrated Circuits—"ASICs"; or Field Programmable Logic Arrays). Depicted in the exemplary embodiment of FIG. 7, however, is programmable circuitry, comprising a processor 603 coupled to one or more memory devices 605 (e.g., Random Access Memory, Magnetic Disc Drives, Optical Disk Drives, Read Only Memory, etc.) and to an interface 607 that enables bidirectional communication with node components/functional blocks such as but not limited to those depicted in FIG. 5 and represented in FIG. 4. The memory device(s) 605 store program means 609 (e.g., a set of processor instructions) configured to cause the processor 603 to control other node elements so as to carry out any of the aspects described above, such as but not limited to those described with reference to FIGS. 2 through 5. The memory device(s) 605 may also store data (not shown) representing various constant and variable parameters as may be needed by the processor 603 and/or as may be generated when carrying out its functions such as those specified by the program means 609.

It will be appreciated that the above-described technology provides increased capacity for a BTS that provides both terrestrial and aerial coverage by being able to reduce interference from an A2G link when that link reuses carrier frequencies associated with terrestrial communication devices.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of operating a mobile communication network node to simultaneously serve a user equipment in a terrestrial mobile communication network and an aerial radio node on a same carrier frequency, the method comprising:
    causing the mobile communication network node to perform:
        directing a first reception beam towards the aerial radio node and receiving a line-of-sight first signal using the first reception beam;
        directing a second reception beam towards the user equipment in the terrestrial mobile communication network and receiving a second signal using the second reception beam;
        using the line-of-sight first signal as a reference signal and identifying therefrom a contribution comprising any multipath components associated with the first signal in the second signal;
        filtering the first signal using an adaptive filter to provide a replica signal corresponding to the contribution comprising any multipath components associated with the first signal in the second signal; and
        subtracting the replica signal from the second signal to obtain a desired signal.

2. The method of claim 1, wherein a direction of the first reception beam is determined based on Global Positioning System (GPS) coordinates associated with the aerial radio node.

3. The method of claim 2, further comprising:
receiving an "Automatic Dependent Surveillance-Broadcast Out" (ADS-B) signal comprising the GPS coordinates associated with the aerial radio node.

4. A mobile communication network node for simultaneous communication with a user equipment in a terrestrial mobile communication network and an aerial radio node on a same carrier frequency, the network node comprising:
a first antenna array to receive a line-of-sight first signal from the aerial radio node;
a first beamformer to adjust antenna weights of the first antenna array to provide a first reception beam directed towards the aerial radio node;
a second antenna array to receive a second signal from the user equipment in the terrestrial mobile communication network;
a second beamformer to adjust antenna weights of the second antenna array to provide a second reception beam directed towards the user equipment in the terrestrial mobile communication network;
an adaptive filter adapted to receive the line-of-sight first signal and the second signal and to use the received line-of-sight first signal as a reference signal to identify therefrom a contribution comprising any multipath components associated with the first signal in the second signal and to output a replica signal corresponding to the contribution comprising any multipath components associated with the first signal in the second signal; and
a subtractor to subtract the replica signal from the second signal to obtain a desired signal.

5. The network node of claim 4, wherein:
the second antenna array is the first antenna array.

6. The network node of claim 4, further comprising an antenna to receive an Automatic Dependent Surveillance-Broadcast Out (ADS-B) signal comprising GPS coordinates associated with the aerial radio node.

7. The network node of claim 6, further comprising a beam tracker adapted to steer the digital weights of the first beamformer using the GPS coordinates received in the ADS-B signal.

8. The network node of claim 4, further comprising a controller wherein the controller comprises:
one or more processors adapted to control elements of the network node.

9. A non-transitory computer readable storage medium comprising a set of instructions that, when performed by one or more processors, carry out functionality of a method of operating a mobile communication network node to simultaneously serve a user equipment in a terrestrial mobile communication network and an aerial radio node on a same carrier frequency, the method comprising:
causing the mobile communication network node to perform:
directing a first reception beam towards the aerial radio node and receiving a line-of-sight first signal using the first reception beam;
directing a second reception beam towards the user equipment in the terrestrial mobile communication network and receiving a second signal using the second reception beam;
using the line-of-sight first signal as a reference signal and identifying therefrom a contribution comprising any multipath components associated with the first signal in the second signal;
filtering the first signal using an adaptive filter to provide a replica signal corresponding to the contribution comprising any multipath components associated with the first signal in the second signal; and
subtracting the replica signal from the second signal to obtain a desired signal.

* * * * *